Oct. 28, 1930.                D. E. SHRAUGER                1,779,859
                        SCREEN FRAME CONSTRUCTION
                           Filed March 24, 1930
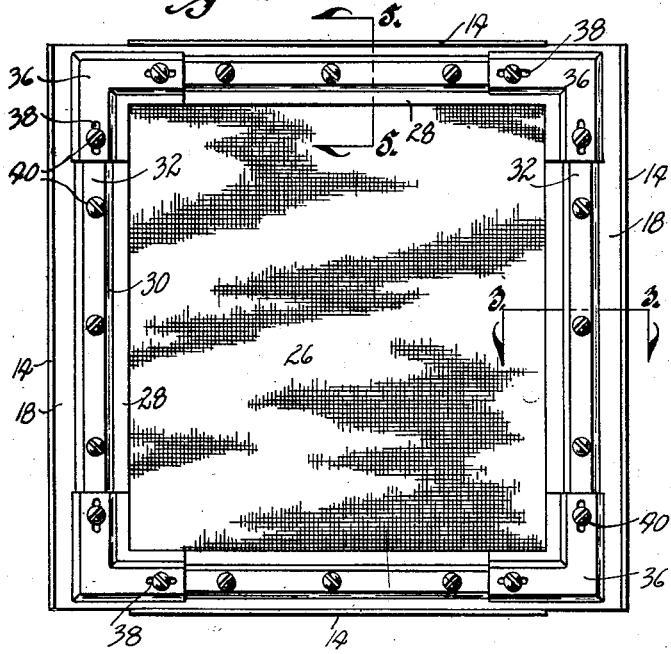
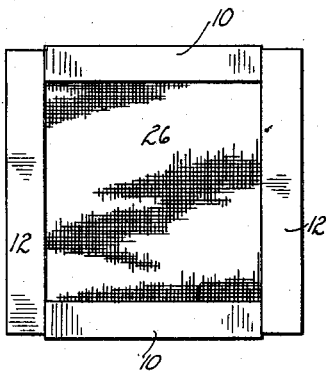
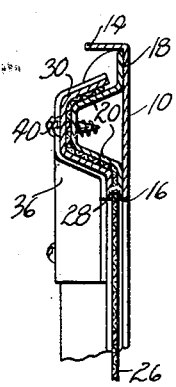
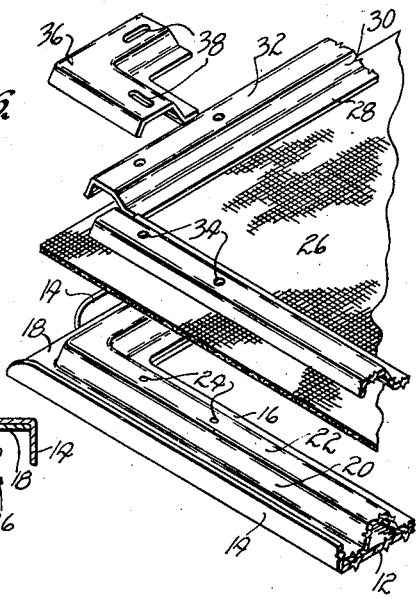
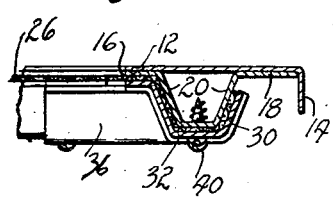
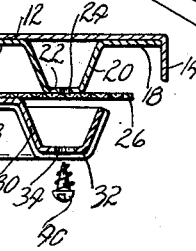

Patented Oct. 28, 1930

1,779,859

UNITED STATES PATENT OFFICE

DARIUS E. SHRAUGER, OF ATLANTIC, IOWA

SCREEN-FRAME CONSTRUCTION

Original application filed February 4, 1929, Serial No. 337,328. Divided and this application filed March 24, 1930. Serial No. 438,483.

The subject matter of this application was originally included in, but has been divided from my application for a window half screen filed February 4, 1929, Serial Number 337,328.

The primary object of the present invention is to provide a window screen frame of novel construction whereby a screen covering may be applied and stretched relative thereto in a convenient manner.

A further object of the invention is to provide an improved screen frame construction embodying coacting molding members having sloping sides and adapted to receive marginal portions of the screen covering between them whereby the screen covering is drawn and held taut by the interengagement of said molding members.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is an outer face view of a window screen constructed in accordance with my invention.

Figure 2 is an inner face view of the same on a reduced scale.

Figure 3 is a detail section through one of the stiles of the frame and its coacting molding members on the line 3—3 of Figure 1.

Figure 4 is a similar view showing the parts in position prior to assembly.

Figure 5 is a detail section through one of the rails of the frame and its coacting molding members on the line 5—5 of Figure 1.

Figure 6 is a perspective view illustrating the various elements of the device prior to assembly.

The screen includes a substantially rectangular flat frame formed of a pair of rails 10 and a pair of stiles 12. This frame may be formed of one sheet of metal having a relatively large rectangular opening cut through it, or it may be fabricated from several strips of metal. The outer margins of the rails 10 and stiles 12 are here shown as formed with flanges 14 which are substantially co-extensive with said frame members and are employed to coact with other members, not shown, when the screen is mounted in position for use.

On the outer face of each frame member 10 or 12 is mounted a molding member having flat portions or flanges 16 and 18 which contact with and are secured to the frame members by any suitable means such as spot welding. Intermediate the attaching portions 16 and 18, each molding member is formed with a longitudinal projection or rib having sloping sides 20 and a flat top 22 formed with spaced openings 24. The sloping side walls 20 of the projections diverge toward the frame members 10 or 12 on which the molding members are mounted and said projections constitute truncated portions of elongated triangular prisms.

A screen covering 26 is provided for the screen frame and its peripheral edges are adapted to fit over the molding members and to be secured thereto by coacting molding cover members.

A molding cover member is provided for each of the molding members of the frame and is of the same cross sectional formation and extends substantially but not quite from end to end of the corresponding molding member.

Each molding cover member is formed at its inner margin with a flange or flat portion 28 corresponding to the attaching flange 16 of a molding member and is also formed with sloping sides 30 and a flat top 32 formed with spaced holes 34 which register with the holes 24 of the molding members.

Corner pieces 36 are provided for the respective corners of the frame, and each corner piece is similar in cross sectional formation with the molding cover members and is adapted to overlie the ends of adjacent molding cover members in order to complete the corner of the frame. Each corner piece 36 is formed at each end with a longitudinally extending slot 38 which may be caused to register with an opening 34 of the molding member.

The flat rectangular frame composed of the rails 10 and stiles 12 has the molding members permanently assembled thereto and together they constitute the base frame of the screen frame construction.

A sheet of screen covering 26 of suitable size is laid upon the base frame thus formed, with its edge portions slightly overlapping the molding members as indicated in Figure 4. The molding cover members are superimposed on the screen covering and are pressed toward the base frame, causing the peripheral portions of the screen covering to be received between the molding members and molding cover members.

Inasmuch as the sides of the projecting portions of the molding members and molding cover members diverge toward the rectangular frame, it follows that when these members are pressed together, the screen cover 26 will be drawn taut in all four directions from its center.

Screws 40 are then mounted through the openings 34 and 24, forcing their way through the meshes of the screen cover, and these screws serve to hold the molding cover members firmly in position and thereby to hold the screen cover in its stretched or taut condition.

The corner pieces 36 are also placed in position over adjacent ends of the molding cover members and are held in place conjunctively therewith by certain of the screws 40 extending through slots 38.

The members of this screen frame are formed of sheet metal by pressing and stamping and when assembled they provide a screen frame which is durable and compact.

The interengaging molding members and molding cover members with their sloping sides provide a convenient and effective method of drawing the screen cover tight and holding it in the proper position when the screws 40 are inserted.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. In a screen construction, a screen frame comprising a substantially rectangular flat frame member, a molding member thereon having a raised portion formed with side walls diverging toward the flat frame member, a molding cover member similar in cross-sectional formation to the molding member and adapted to fit and be secured to the same in nesting relation, and a screen covering for said frame having its edges clamped and held between the molding member and molding cover member.

2. In a screen construction, a screen frame comprising a substantially rectangular flat frame member, a molding member thereon having attaching flanges secured to said flat frame member and having between said attaching flanges a raised portion formed with side walls diverging toward the flat frame member, a molding cover member similar in cross-sectional formation to the molding member and adapted to fit and be secured to the same in nesting relation, and a screen covering for said frame having its edges clamped and held between the molding member and molding cover member.

3. In a screen construction, a screen frame comprising a substantially rectangular flat frame member, a molding member thereon having a raised portion formed with side walls diverging toward the flat frame member, a molding cover member similar in cross-sectional formation to the molding member and adapted to fit and be secured to the same in nesting relation, a screen covering for said frame having its edges clamped and held between the molding member and molding cover member, and corner members overlying and forming a joint between adjacent ends of molding cover members.

Des Moines, Iowa, March 3, 1930.

DARIUS E. SHRAUGER.